(12) United States Patent
Arauchi et al.

(10) Patent No.: US 12,435,995 B2
(45) Date of Patent: Oct. 7, 2025

(54) CONTROL SYSTEM

(71) Applicant: Mitsubishi Electric Corporation, Tokyo (JP)

(72) Inventors: Koki Arauchi, Tokyo (JP); Hiroshi Aizawa, Tokyo (JP); Tatsuji Irie, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 604 days.

(21) Appl. No.: 17/947,755

(22) Filed: Sep. 19, 2022

(65) Prior Publication Data
US 2023/0332924 A1 Oct. 19, 2023

(30) Foreign Application Priority Data
Apr. 15, 2022 (JP) ................................ 2022-067496

(51) Int. Cl.
G01C 21/00 (2006.01)
(52) U.S. Cl.
CPC ..... G01C 21/3889 (2020.08); G01C 21/3841 (2020.08); G01C 21/3896 (2020.08)
(58) Field of Classification Search
CPC ............ G01C 21/3889; G01C 21/3841; G01C 21/3896
See application file for complete search history.

(56) References Cited

U.S. PATENT DOCUMENTS

2021/0179023 A1* 6/2021 Hasegawa ............... B60L 53/31
2023/0336429 A1* 10/2023 Koyasako ............... H04L 12/28

FOREIGN PATENT DOCUMENTS

| JP | 2016181752 | * 10/2016 | ............. Y02P 90/10 |
| JP | 2022-013035 A | 1/2022 | |
| WO | 2011/024237 A1 | 3/2011 | |

* cited by examiner

*Primary Examiner* — Patrick N Edouard
*Assistant Examiner* — Eboni N Giles
(74) *Attorney, Agent, or Firm* — Sughrue Mion, PLLC

(57) ABSTRACT

Provided is a control system including a control server, an on-vehicle device mounted to a vehicle, and a device to be controlled by a device control signal. The on-vehicle device includes: a vehicle information acquisition unit for acquiring vehicle information including a vehicle ID, and vehicle position information; and a server communication unit for transmitting the vehicle information and the vehicle position information to the control server. The control server includes a communication area determination unit: which determines a vehicle for which the vehicle ID matches a registration vehicle ID, to be a registration vehicle; which generates a device control signal on the basis of device setting information and a device control area determination result being a result of determination as to whether or not the registration vehicle is inside the device control area; and which outputs the device control signal to the device.

13 Claims, 5 Drawing Sheets

CONTROL SYSTEM

BACKGROUND OF THE INVENTION

1. Field of the Invention

The present disclosure relates to a control system.

2. Description of the Background Art

In recent years, operating, through voice recognition, a device such as a household appliance or an electric shutter installed in a facility such as an office or a house has been proposed. For example, acquiring a speech voice of a user by a microphone installed in a facility, performing voice recognition by a voice recognition server outside the facility, and performing control for turning on a power supply of an appliance from an appliance control server outside the facility have been proposed (see Patent Document 1, for example).

Patent Document 1: Japanese Laid-Open Patent Publication No. 2022-13035

The control system shown in Patent Document 1 has a problem that the user has to vocalize in order to control a device.

SUMMARY OF THE INVENTION

The present disclosure has been made in order to solve the above-described problem. An object of the present disclosure is to provide a control system in which there is no need for a user to vocalize and that can control a device by merely moving a vehicle to a specific area.

A control system disclosed in the present disclosure includes: a control server; an on-vehicle device mounted to a vehicle; a device to be controlled by a device control signal; and an external terminal for transmitting a registration vehicle ID, device setting information, and information of a vehicle-to-vehicle communication area and a device control area to the control server. The on-vehicle device includes: a vehicle information acquisition unit for acquiring vehicle information including a vehicle ID unique to the vehicle, and vehicle position information of the vehicle; a server communication unit for transmitting the vehicle information and the vehicle position information to the control server and for receiving information from the control server; and a vehicle-to-vehicle communication unit for performing vehicle-to-vehicle communication. The control server includes: an external terminal communication unit for performing communication with the external terminal; a device setting information storage unit for storing the device setting information acquired from the external terminal communication unit; an area setting information storage unit for storing information of the vehicle-to-vehicle communication area and the device control area acquired from the external terminal communication unit; a map information acquisition unit for acquiring map information; an on-vehicle device communication unit for performing communication with the on-vehicle device; a device communication unit for performing communication with the device; and a communication area determination unit. The communication area determination unit: determines the vehicle for which the vehicle ID included in the vehicle information matches the registration vehicle ID, to be a registration vehicle; sets the on-vehicle device of the vehicle for which the vehicle ID included in the vehicle information matches the registration vehicle ID, as a registration on-vehicle device; outputs, when the registration vehicle is inside the vehicle-to-vehicle communication area, a vehicle-to-vehicle communication permission signal to the registration on-vehicle device via the on-vehicle device communication unit; generates the device control signal on the basis of the device setting information and a device control area determination result being a result of determination as to whether or not the registration vehicle is inside the device control area, and outputs the device control signal to the device via the device communication unit; and outputs the vehicle information and the device control signal to the external terminal via the external terminal communication unit. In the on-vehicle device, when the server communication unit has received the vehicle-to-vehicle communication permission signal, the vehicle-to-vehicle communication unit performs vehicle-to-vehicle communication.

The control system disclosed in the present disclosure includes a control server, an on-vehicle device mounted to a vehicle, and a device to be controlled by a device control signal. The on-vehicle device includes: a vehicle information acquisition unit for acquiring vehicle information including a vehicle ID unique to the vehicle, and vehicle position information of the vehicle; and a server communication unit for transmitting the vehicle information and the vehicle position information to the control server. The control server includes: a device communication unit for performing communication with the device; and a communication area determination unit. The communication area determination unit: determines the vehicle for which the vehicle ID included in the vehicle information matches the registration vehicle ID, to be a registration vehicle; sets the on-vehicle device of the registration vehicle as a registration on-vehicle device; generates the device control signal on the basis of the device setting information and a device control area determination result being a result of determination as to whether or not the registration vehicle is inside a device control area; and outputs the device control signal to the device via the device communication unit. Therefore, there is no need for the user to vocalize, and the device can be controlled by merely moving the vehicle to a specific area.

DETAILED DESCRIPTION OF THE PREFERRED EMBODIMENTS OF THE INVENTION

Figure 1:
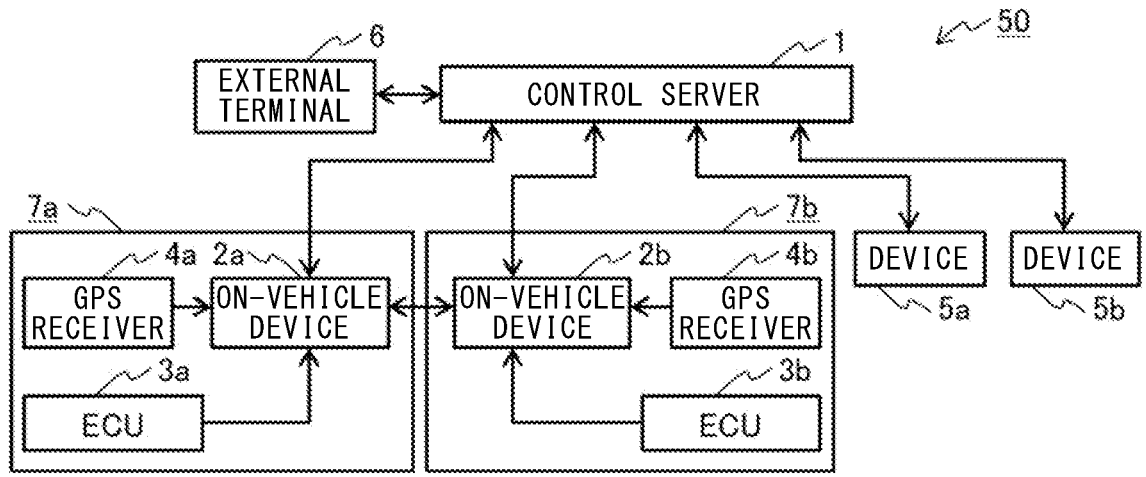
FIG. 1 shows a configuration of a control system according to a first embodiment.

Hereinafter, a control system according to an embodiment for carrying out the present disclosure will be described in detail with reference to the drawings. In the drawings, the same reference characters denote the same or corresponding parts.

First Embodiment

FIG. 1 shows a configuration of a control system 50 according to a first embodiment. The control system 50 according to the first embodiment includes a control server 1, on-vehicle devices 2a, 2b, devices 5a, 5b, and an external terminal 6. The on-vehicle device 2a is mounted to a vehicle 7a, and the vehicle 7a includes a GPS receiver 4a and an ECU 3a. The on-vehicle device 2b is provided to a vehicle 7b, and the vehicle 7b includes a GPS receiver 4b and an ECU 3b. The on-vehicle device 2a, the on-vehicle device 2b, the device 5a, the device 5b, and the external terminal 6 each communicate with the control server 1.

Each of the device 5a and the device 5b is a household appliance such as a water heater, an air conditioner, or a rice cooker, for example, and is an electric shutter, for example. Each of the device 5a and the device 5b is installed in a facility such as an office or a house, for example, or is installed in an own house, for example. The device 5a and the device 5b are controlled by the control server 1. Each of the device 5a and the device 5b has information of a device registration name unique to the device, and the device 5a and the device 5b transmit respective device registration names to the control server 1.

The external terminal 6 transmits, to the control server 1, a registration vehicle ID, device setting information, and information of a vehicle-to-vehicle communication area and a device control area. The external terminal 6 is, for example, a mobile terminal such as a smartphone, and is, for example, a computer having a transmission/reception function. For example, when a user registers a vehicle ID of a vehicle owned by the user, as a registration vehicle ID, the vehicle owned by the user is registered as a registration vehicle. The vehicle-to-vehicle communication area shows an area in which a registration vehicle performs vehicle-to-vehicle communication. The device setting information and the device control area are information to be used when a device control signal is generated.

Figure 2:
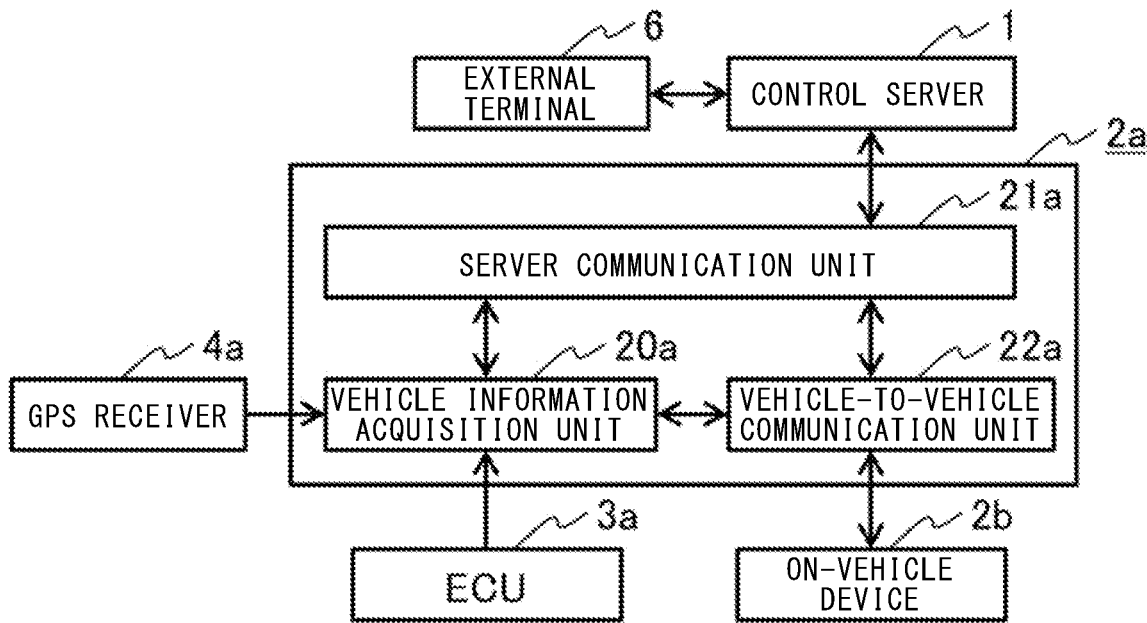
FIG. 2 shows a configuration of an on-vehicle device according to the first embodiment.

FIG. 2 shows a configuration of the on-vehicle device 2a in the first embodiment. The on-vehicle device 2a includes a vehicle information acquisition unit 20a, a server communication unit 21a, and a vehicle-to-vehicle communication unit 22a. The ECU 3a is an electronic control unit (ECU), and the vehicle information acquisition unit 20a acquires a vehicle state quantity such as a vehicle speed of the vehicle, a brake operation amount, an engine operation state, or a vehicle orientation angle, regarding the vehicle 7a, from the ECU 3a through communication according to Controller Area Network (CAN), for example. The vehicle information acquisition unit 20a may acquire a vehicle state quantity from a state quantity sensor that acquires a vehicle state quantity such as a vehicle speed of the vehicle, a brake operation amount, an engine operation state, or a vehicle orientation angle, regarding the vehicle 7a. The vehicle information acquisition unit 20a acquires information of a vehicle ID unique to the vehicle 7a from a vehicle ID storage unit (not shown), combines the vehicle state quantity acquired from the ECU 3a and the vehicle ID acquired from the vehicle ID storage unit together to be used as vehicle information, and outputs the vehicle information to the server communication unit 21a. The vehicle information acquisition unit 20a may output, as the vehicle information, information obtained by adding a predetermined vehicle ID unique to the vehicle 7a to the vehicle state quantity acquired from the ECU 3a. The GPS receiver 4a receives a radio wave from a global positioning system (GPS) satellite and outputs vehicle position information of the vehicle 7a to the vehicle information acquisition unit 20a. The vehicle information acquisition unit 20a outputs the acquired vehicle position information to the server communication unit 21a.

The server communication unit 21a transmits, to the control server 1, the vehicle information and the vehicle position information acquired from the vehicle information acquisition unit 20a. For communication between the server communication unit 21a and the control server 1, a public communication line such as 4G or 5G is used, for example. The server communication unit 21a receives a vehicle-to-vehicle communication permission signal described later from the control server 1, and outputs the vehicle-to-vehicle communication permission signal to the vehicle-to-vehicle communication unit 22a. The vehicle-to-vehicle communication unit 22a is a communication unit for performing vehicle-to-vehicle communication, and performs vehicle-to-vehicle communication with the on-vehicle device 2b being another on-vehicle device mounted to another vehicle, when the vehicle-to-vehicle communication unit 22a has acquired the vehicle-to-vehicle communication permission signal. The vehicle information acquisition unit 20a may acquire information of a vehicle ID unique to the vehicle 7a from the vehicle ID storage unit (not shown), acquire a vehicle state quantity from the ECU 3a, acquire communication state information indicating the communication state of vehicle-to-vehicle communication such as a radio wave intensity of vehicle-to-vehicle communication from the vehicle-to-vehicle communication unit 22a, combine the vehicle ID, the vehicle state quantity, and the communication state information together, to be used as vehicle information, and output the vehicle information to the server communication unit 21a.

Figure 3:
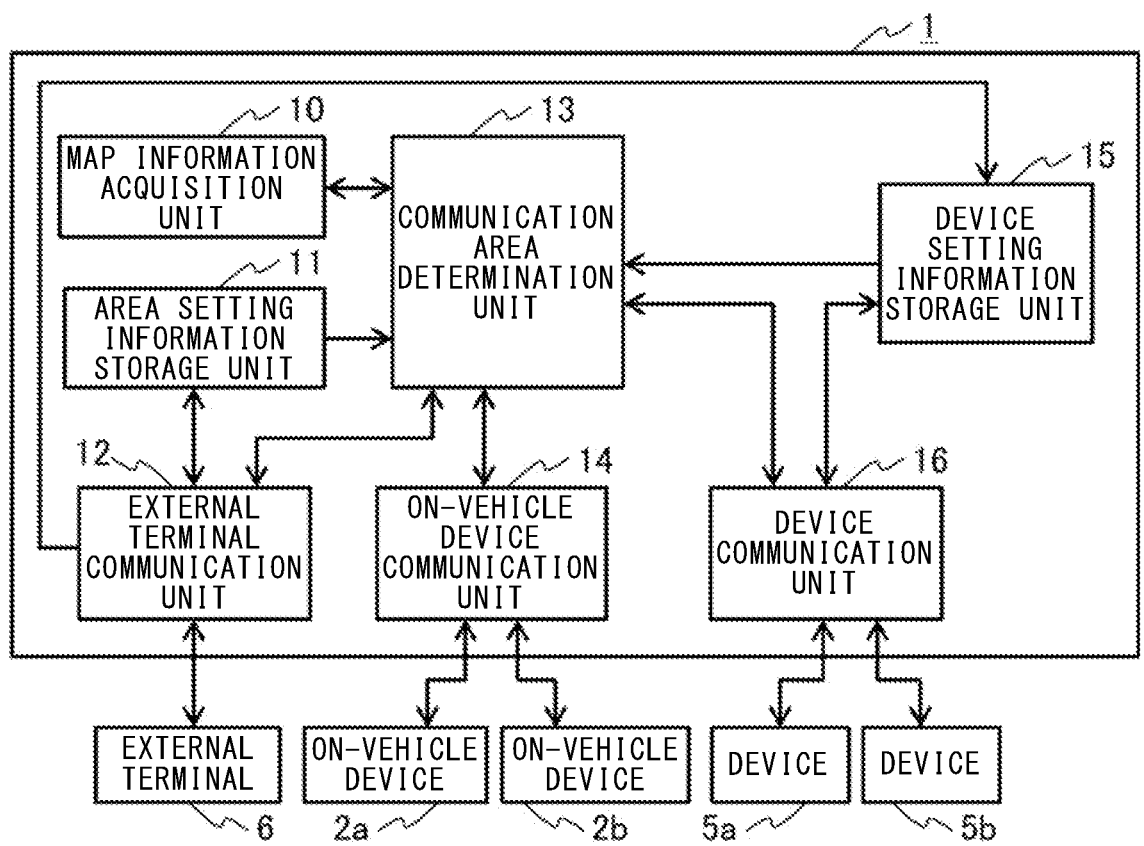
FIG. 3 shows a configuration of a control server according to the first embodiment.

FIG. 3 shows a configuration of the control server 1 in the first embodiment. The control server 1 includes a map information acquisition unit 10, an area setting information storage unit 11, an external terminal communication unit 12, a communication area determination unit 13, an on-vehicle device communication unit 14, a device setting information storage unit 15, and a device communication unit 16. The control server 1 may be realized by a cloud server. The map information acquisition unit 10 acquires map information in accordance with a request from the communication area determination unit 13, and outputs the map information to the communication area determination unit 13. The map information acquisition unit 10 acquires map information from a map data storage device provided to the control server 1, for example. The map information acquisition unit 10 may acquire map information from outside of the control server 1 through communication or the like, for example.

The external terminal communication unit 12 performs communication with the external terminal 6. The external terminal communication unit 12 outputs information of a vehicle-to-vehicle communication area and a device control area received from the external terminal 6, to the area setting information storage unit 11, outputs device setting information received from the external terminal 6, to the device setting information storage unit 15, and outputs a registration vehicle ID received from the external terminal 6, to the communication area determination unit 13. The area setting information storage unit 11 stores therein information of the vehicle-to-vehicle communication area and the device control area acquired from the external terminal communication unit 12. The device setting information storage unit 15 stores therein the device setting information acquired from the external terminal communication unit 12.

The communication area determination unit 13 may output the map information acquired from the map information acquisition unit 10, to the external terminal 6 via the external terminal communication unit 12. The external terminal 6 may include a display unit for displaying the map information acquired from the external terminal communication unit 12. The external terminal 6 may set a vehicle-to-vehicle communication area or a device control area by designating a position on a map in a state where the map information is displayed on the display unit.

The on-vehicle device communication unit 14 performs communication with the on-vehicle device 2a and the on-vehicle device 2b, and outputs, to the communication area determination unit 13, vehicle information and vehicle position information received from each of the on-vehicle device 2a and the on-vehicle device 2b. The communication area determination unit 13 registers received respective vehicle IDs of the on-vehicle device 2a and the on-vehicle device 2b, as communication target vehicle IDs, into a vehicle information storage unit (not shown). The communication area determination unit 13 may store the received respective vehicle IDs of the on-vehicle device 2a and the on-vehicle device 2b, as communication target vehicle IDs.

The device communication unit 16 performs communication with the device 5a and the device 5b. The device 5a and the device 5b may each transmit device setting information to the control server 1, and the device communication unit 16 may receive device setting information from the device 5a or the device 5b. The device setting information received by the device communication unit 16 is stored into the device setting information storage unit 15.

Figure 4:
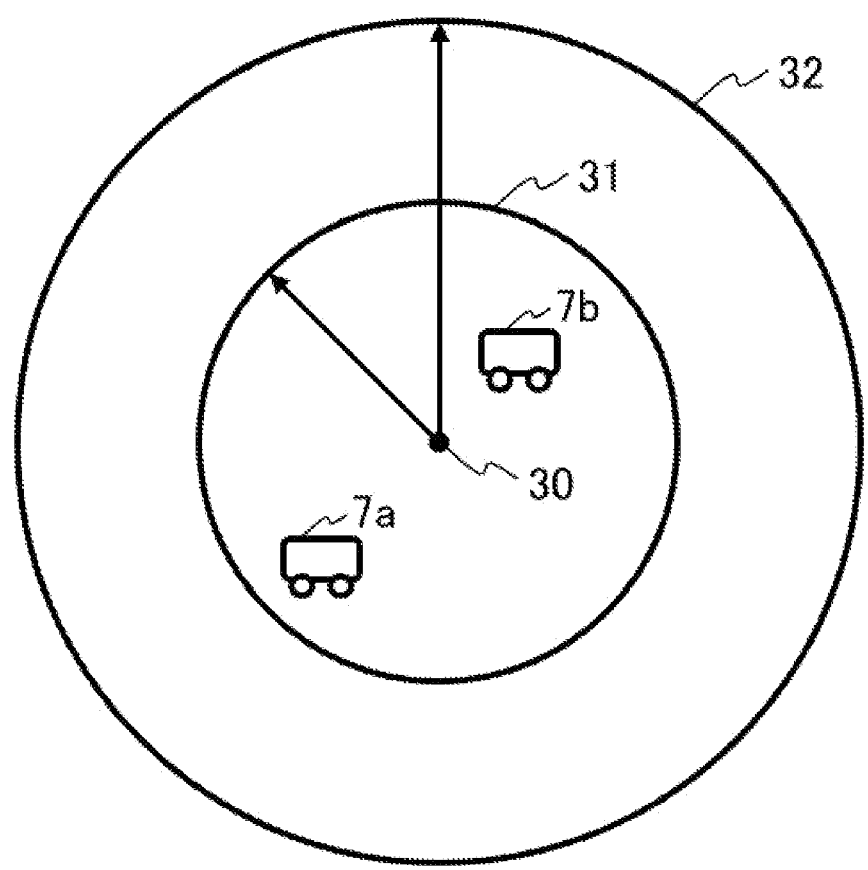
FIG. 4 shows an example of a vehicle-to-vehicle communication area and a device control area in the first embodiment.

FIG. 4 shows an example of a vehicle-to-vehicle communication area 31 and a device control area 32 in the first embodiment. In the example shown in FIG. 4, the vehicle-to-vehicle communication area 31 and the device control area 32 are each set as a circular area having an own house 30 as the center, and the device control area 32 includes the vehicle-to-vehicle communication area 31. The vehicle-to-vehicle communication area 31 is a region in which registration vehicles perform vehicle-to-vehicle communication with each other in a parking lot or a bicycle parking lot in a peripheral area of the own house, for example. The device control area 32 is a region having the own house as the center, for example. The vehicle-to-vehicle communication area 31 and the device control area 32 may each be a region of any shape. The vehicle-to-vehicle communication area 31 and the device control area 32 may each be a polygonal region obtained by selecting a plurality of coordinates (latitude and longitude) on a map displayed on the display unit of the external terminal 6. There is no restriction on the sizes of the device control area 32 and the vehicle-to-vehicle communication area 31, and the sizes and the positional relationship of the device control area 32 and the vehicle-to-vehicle communication area 31 may be freely set.

Figure 5:
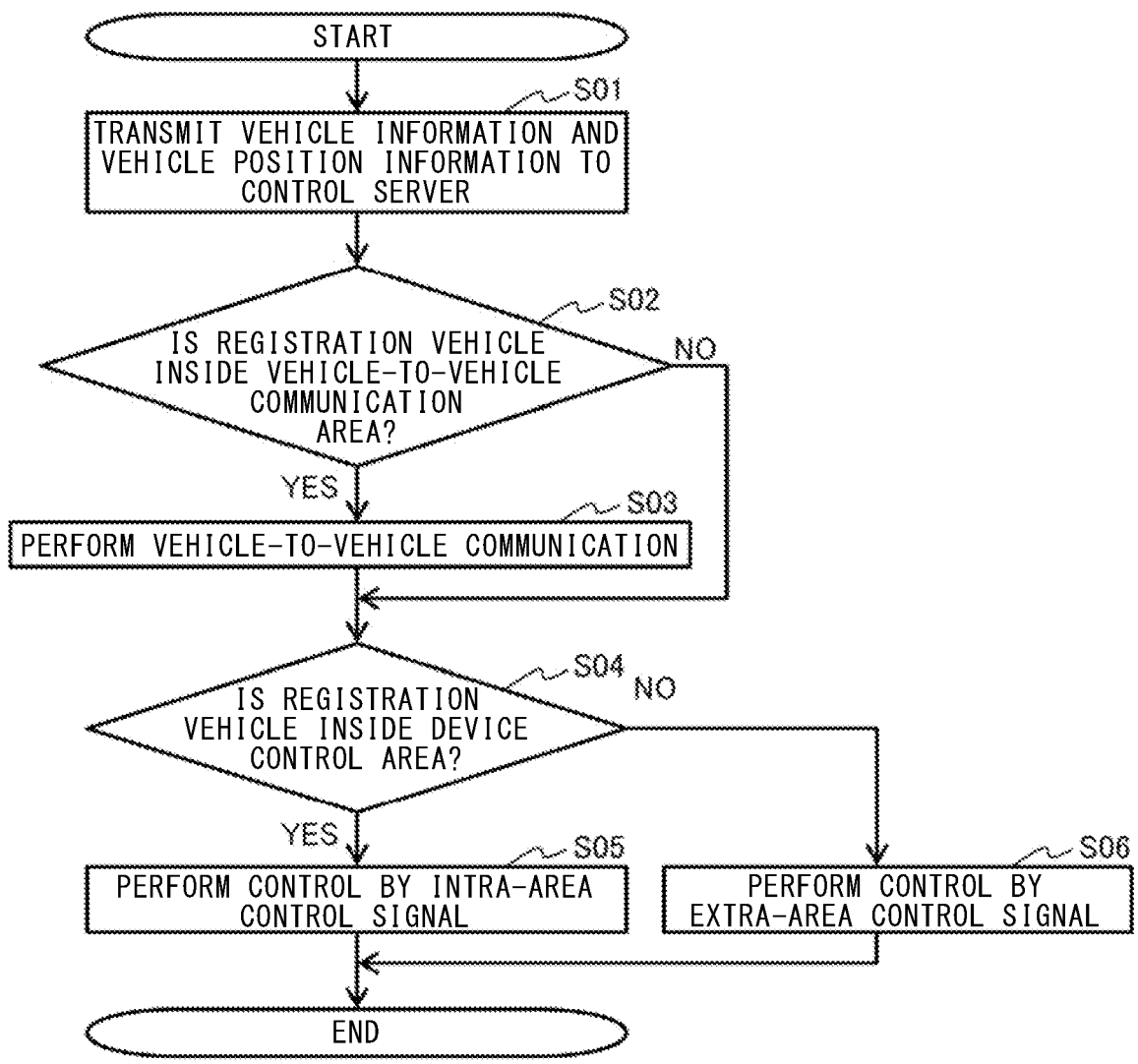
FIG. 5 is a flow chart for describing operation of the control system according to the first embodiment.

FIG. 5 is a flow chart for describing operation of the control system according to the first embodiment. The process shown in the flow chart in FIG. 5 is performed after a registration vehicle ID, device setting information, a vehicle-to-vehicle communication area, and a device control area have been set in advance from the external terminal 6. The device setting information may be set in advance from the device 5a or the device 5b. The process shown in the flow chart in FIG. 5 is executed in a constant cycle, for example, and is executed in one-second cycles, for example.

Step S01 is a vehicle information transmission step, step S02 is a vehicle-to-vehicle communication area determination step, step S03 is a vehicle-to-vehicle communication step, step S04 is a device control area determination step, step S05 is an intra-area control step, and step S06 is an extra-area control step.

In step S01, the on-vehicle device 2a acquires vehicle information and vehicle position information of the vehicle 7a in the vehicle information acquisition unit 20a, and outputs the vehicle information and vehicle position information to the server communication unit 21a, and the server communication unit 21a transmits the acquired vehicle information and vehicle position information to the on-vehicle device communication unit 14 of the control server 1. Similar to the on-vehicle device 2a, the on-vehicle device 2b transmits vehicle information and vehicle position information of the vehicle 7b to the on-vehicle device communication unit 14 of the control server 1. The on-vehicle device communication unit 14 of the control server 1 receives the vehicle information and the vehicle position information of the vehicle 7a from the on-vehicle device 2a, receives the vehicle information and the vehicle position information of the vehicle 7b from the on-vehicle device 2b, and outputs the respective pieces of vehicle information and vehicle position information to the communication area determination unit 13. The communication area determination unit 13 acquires the vehicle information and the vehicle position information, and proceeds to step S02.

In step S02, first, when the vehicle ID included in the vehicle information acquired from the on-vehicle device matches a registration vehicle ID, the communication area determination unit 13 determines the vehicle to which the on-vehicle device is mounted, to be a registration vehicle, and sets the on-vehicle device as a registration on-vehicle device. Next, the communication area determination unit 13 acquires information of the vehicle-to-vehicle communication area 31 from the area setting information storage unit 11. Further, the communication area determination unit 13 determines whether or not the vehicle position information acquired from the registration vehicle is inside the vehicle-to-vehicle communication area 31, that is, whether or not the registration vehicle is inside the vehicle-to-vehicle communication area 31. When the registration vehicle is inside the vehicle-to-vehicle communication area 31, the communication area determination unit 13 proceeds to step S03. When the registration vehicle is not inside the vehicle-to-vehicle communication area 31, the communication area determination unit 13 proceeds to step S04. For determination as to whether or not the registration vehicle is inside the vehicle-to-vehicle communication area 31, various mathematical techniques have been proposed. For example, the determination can be performed by using Cauchy's integral theorem. In step S03, the communication area determination unit 13 outputs a vehicle-to-vehicle communication permission signal to the registration on-vehicle device via the on-vehicle device communication unit 14. The registration on-vehicle device having received the vehicle-to-vehicle communication permission signal performs vehicle-to-vehicle communication by means of the vehicle-to-vehicle communication unit, and the process proceeds to step S04.

For example, in step S02, when the vehicle ID included in the vehicle information acquired from the on-vehicle device 2a matches a registration vehicle ID, the communication area determination unit 13 determines the vehicle 7a to be a registration vehicle, and sets the on-vehicle device 2a as a registration on-vehicle device. When the vehicle 7a is inside the vehicle-to-vehicle communication area, the communication area determination unit 13 proceeds to step S03. When the vehicle 7a is not inside the vehicle-to-vehicle communication area, the communication area determination unit 13 proceeds to step S04. In step S03, the communication area determination unit 13 outputs a vehicle-to-vehicle communication permission signal via the on-vehicle device communication unit 14 to the on-vehicle device 2a being the registration on-vehicle device. The on-vehicle device 2a being the registration on-vehicle device having received the vehicle-to-vehicle communication permission signal performs vehicle-to-vehicle communication by means of the vehicle-to-vehicle communication unit 22a, and the process proceeds to step S04. For example, in step S02, when the vehicle ID included in the vehicle information acquired from the on-vehicle device 2b matches a registration vehicle ID, the communication area determination unit 13 determines the vehicle 7b to be a registration vehicle, sets the on-vehicle device 2b as a registration on-vehicle device, and performs a similar process. When the vehicle 7a and the vehicle 7b are at the positions shown in FIG. 4, both of the vehicle 7a and the vehicle 7b are inside the vehicle-to-vehicle communication area, and thus, a vehicle-to-vehicle communication permission signal is transmitted to both of the on-vehicle device 2a and the on-vehicle device 2b, and vehicle-to-vehicle communication can be performed between the on-vehicle device 2a and the on-vehicle device 2b. For example, vehicle-to-vehicle communication is established between the on-vehicle device 2a and the on-vehicle device 2b. Through these processes, the on-vehicle device 2a and the on-vehicle device 2b perform vehicle-to-vehicle communication only when the registration vehicles are inside the vehicle-to-vehicle communication area. Therefore, the communication load due to vehicle-to-vehicle communication can be suppressed, and power consumption due to vehicle-to-vehicle communication can be suppressed. For example, in a case where an on-vehicle device is mounted to a motorcycle having a small battery capacity, power consumption due to vehicle-to-vehicle communication can be suppressed through the above processes, which is effective. The communication area determination unit 13 may transmit information of a registration vehicle ID via the on-vehicle device communication unit 14 to the registration on-vehicle device, and the vehicle-to-vehicle communication unit of the registration on-vehicle device may perform vehicle-to-vehicle communication only with a vehicle of which the vehicle ID matches the registration vehicle ID. Accordingly, the communication load due to vehicle-to-vehicle communication can be further suppressed.

In step S02, when the registration vehicle is not inside the vehicle-to-vehicle communication area 31, the communication area determination unit 13 proceeds to step S04. However, when the registration vehicle is not inside the vehicle-to-vehicle communication area 31, the communication area determination unit 13 may output a vehicle-to-vehicle communication non-permission signal via the on-vehicle device communication unit 14 to the registration on-vehicle device. The registration on-vehicle device having received the vehicle-to-vehicle communication non-permission signal does not perform vehicle-to-vehicle communication by means of the vehicle-to-vehicle communication unit, and when vehicle-to-vehicle communication has already been performed by means of the vehicle-to-vehicle communication unit, the communication is stopped. Then, the process may proceed to step S04.

In the on-vehicle device 2a, when vehicle-to-vehicle communication has been interrupted during the vehicle-to-vehicle communication in the vehicle-to-vehicle communication unit 22a, the vehicle-to-vehicle communication unit 22a may output, to the server communication unit 21a, a vehicle-to-vehicle communication interruption signal indicating that the vehicle-to-vehicle communication has been interrupted. The server communication unit 21a may acquire the vehicle-to-vehicle communication interruption signal from the vehicle-to-vehicle communication unit 22a, acquire vehicle information from the vehicle information acquisition unit 20a, and transmit the vehicle-to-vehicle communication interruption signal and the vehicle information to the on-vehicle device communication unit 14 of the control server 1. The on-vehicle device communication unit 14 having received the vehicle-to-vehicle communication interruption signal and the vehicle information may output the vehicle-to-vehicle communication interruption signal and the vehicle information to the communication area determination unit 13, and the communication area determination unit 13 may output the vehicle-to-vehicle communication interruption signal and the vehicle information to the external terminal 6 via the external terminal communication unit 12, for example. In the external terminal 6, the received vehicle-to-vehicle communication interruption signal and vehicle information are displayed on the display unit, whereby the user can know that the vehicle-to-vehicle communication has been interrupted in the vehicle 7a having the on-vehicle device 2a mounted thereto. Similar processes may be performed also in the on-vehicle device 2b.

The communication area determination unit 13 may output a vehicle state confirmation signal to at least one of the on-vehicle device 2a and the on-vehicle device 2b via the on-vehicle device communication unit 14. For example, when the on-vehicle device 2a has received a vehicle state confirmation signal, the on-vehicle device 2a acquires the vehicle information and the vehicle position information of the vehicle 7a by means of the vehicle information acquisition unit 20a, and the vehicle information and the vehicle position information are outputted to the server communication unit 21a. The server communication unit 21a transmits the acquired vehicle information and vehicle position information to the on-vehicle device communication unit 14 of the control server 1. The on-vehicle device communication unit 14 outputs the received vehicle information and vehicle position information to the communication area determination unit 13. When the on-vehicle device 2b has received a vehicle state confirmation signal as well, similar processes are performed. The communication area determination unit 13 outputs the acquired vehicle information and vehicle position information to the external terminal 6 via the external terminal communication unit 12, and the external terminal 6 displays the acquired vehicle information and vehicle position information on the display unit. Accordingly, the user can confirm the vehicle information and vehicle position information regarding each vehicle.

In step S04 in FIG. 5, first, the communication area determination unit 13 acquires information of the device control area 32 from the area setting information storage unit 11, and acquires device setting information from the device setting information storage unit 15. The communication area determination unit 13 determines whether or not the vehicle position information acquired from the registration vehicle in step S01 is inside the device control area 32, that is, whether or not the registration vehicle is inside the device control area 32. When the registration vehicle is inside the device control area 32, the communication area determination unit 13 proceeds to step S05, and when the registration vehicle is not inside the device control area 32, the communication area determination unit 13 proceeds to step S06.

For determination as to whether or not the registration vehicle is inside the device control area 32, various mathematical techniques have been proposed. For example, the determination can be performed by using Cauchy's integral theorem. The device setting information is set for each device, and for example, there is device setting information for the device 5a, and there is device setting information for the device 5b. The device setting information indicates the content of control to be performed on a corresponding device in accordance with a device control area determination result being a result of determination as to whether or not the registration vehicle is inside the device control area 32. For example, the device setting information includes a device registration name, an intra-area control signal being a device control signal at a time when the registration vehicle is inside the device control area 32, and an extra-area control signal being a device control signal at a time when the registration vehicle is outside the device control area 32. The device setting information may include a device registration name and at least one of the intra-area control signal and the extra-area control signal. The intra-area control signal may be a signal that turns on a device, for example. The extra-area control signal may be a signal that turns off a device, for example, or may be a signal that sets a device into a sleep state, for example.

In step S05, the communication area determination unit 13 extracts, as a device control signal, the intra-area control signal for the device 5a from the device setting information for the device 5a, and outputs the intra-area control signal for the device 5a via the device communication unit 16 to the device 5a. The communication area determination unit 13 extracts, as a device control signal, the intra-area control signal for the device 5b from the device setting information for the device 5b, and outputs the intra-area control signal for the device 5b, to the device 5b. The device 5a having received the intra-area control signal for the device 5a executes a control instructed by the intra-area control signal, and the device 5b having received the intra-area control signal for the device 5b executes a control instructed by the intra-area control signal. The communication area determination unit 13 further outputs, via the external terminal communication unit 12, the intra-area control signal for the device 5a to the external terminal 6, and the intra-area control signal for the device 5b to the external terminal 6, and ends the process.

In step S06, the communication area determination unit 13 extracts, as a device control signal, the extra-area control signal for the device 5a from the device setting information of the device 5a, and outputs the extra-area control signal for the device 5a via the device communication unit 16 to the device 5a. The communication area determination unit 13 extracts, as a device control signal, the extra-area control signal for the device 5b from the device setting information for the device 5b, and outputs the extra-area control signal for the device 5b, to the device 5b. The device 5a having received the extra-area control signal for the device 5a executes a control instructed by the extra-area control signal, and the device 5b having received the extra-area control signal for the device 5b executes a control instructed by the extra-area control signal. The communication area determination unit 13 further outputs, via the external terminal communication unit 12, the extra-area control signal for the device 5a to the external terminal 6, and the extra-area control signal for the device 5b to the external terminal 6, and ends the process.

Through these processes, the device 5a and the device 5b can each be controlled on the basis of the device setting information and the vehicle position information of the registration vehicle. In addition, in the external terminal 6, a device control signal being an intra-area control signal or an extra-area control signal is received and the received device control signal is displayed on the display unit. Thus, the user can know that the device control signals have been transmitted to the device 5a and the device 5b, and can know the contents of the device control signals transmitted to the device 5a and the device 5b.

In a case where the device control area 32 is an area including the own house 30, the device control area 32 is, for example, an area having a radius of 10 km from the own house 30, and the vehicle 7a being a registration vehicle having the user riding therein is inside the device control area 32, the communication area determination unit 13 can determine that the user is coming home. When the communication area determination unit 13 has been able to determine that the user is coming home, it is possible to, by controlling the device 5a and the device 5b by intra-area control signals, turn on a household appliance such as a water heater, an air conditioner, or a rice cooker installed in the own house 30, for example, or open an electric shutter installed at the own house 30, for example.

In step S04, when the registration vehicle is inside the device control area 32, the communication area determination unit 13 proceeds to step S05, and when the registration vehicle is not inside the device control area 32, the communication area determination unit 13 proceeds to step S06. However, for example, the acquisition of vehicle information and vehicle position information in step S01 and determination as to whether or not the registration vehicle is inside the device control area 32 in step S04 may be executed a plurality of times every predetermined time period. Then, when determination that the registration vehicle is inside the device control area 32 has been consecutively made a predetermined number of times, the communication area determination unit 13 may proceed to step S05, and when determination that the registration vehicle is inside the device control area 32 has not been consecutively made a predetermined number of times, the communication area determination unit 13 may proceed to step S06. For example, acquisition of vehicle information and vehicle position information in step S01 and determination as to whether or not the registration vehicle is inside the device control area 32 in step S04 are executed ten times every one second. Then, when determination that the registration vehicle is inside the device control area 32 has been made ten consecutive times, the communication area determination unit 13 may proceed to step S05, and when determination that the registration vehicle is inside the device control area 32 has not been made ten consecutive times, the communication area determination unit 13 may proceed to step S06. Accordingly, determination as to whether or not the registration vehicle is inside the device control area 32 can be more assuredly performed.

In a case where the device control area 32 is an area including the own house 30, the device control area 32 is, for example, an area having a radius of 10 km from the own house 30, and the vehicle 7a being a registration vehicle having the user riding therein is outside the device control area 32, the communication area determination unit 13 can determine that the user has gone out. When the communication area determination unit 13 has been able to determine that the user has gone out, it is possible to, by controlling the device 5a and the device 5b by extra-area control signals, turn off a household appliance such as a water heater or an air conditioner installed in the own house 30, for example, or close an electric shutter installed at the own house 30, for example.

When the communication area determination unit 13 has determined that the position indicated by the vehicle position information of the vehicle 7a being a registration vehicle having the user riding therein has changed from the inside of the device control area 32 to the outside of the device control area 32, the communication area determination unit 13 may output a device state confirmation signal to the device 5a and the device 5b via the device communication unit 16. The device 5a and the device 5b having received the device state confirmation signal each transmit device state information being information indicating the state of the device, such as ON, OFF, or sleep state, to the device communication unit 16 of the control server 1, and the device communication unit 16 outputs the device state information to the communication area determination unit 13. The communication area determination unit 13 outputs the acquired device state information to the external terminal 6 via the external terminal communication unit 12, and the external terminal 6 displays the acquired device state information on the display unit. Accordingly, in a case where the user has left the own house while the device 5a or the device 5b is in an ON-state, the user can know that the device 5a or the device 5b is still in an ON-state.

The device setting information may include a device control vehicle ID, and vehicle-limited device setting information corresponding to the device control vehicle ID. The communication area determination unit 13 may determine a vehicle for which the vehicle ID included in the vehicle information matches the device control vehicle ID, to be a device control vehicle. Then, the communication area determination unit 13 may generate a device control signal on the basis of the vehicle-limited device setting information and a device control vehicle area determination result being a result of determination as to whether or not the device control vehicle is inside the device control area 32, and may output the device control signal to a device via the device communication unit 16. The device having received the device control signal executes a control instructed by the device control signal. Through these processes, device controls that are different for respective vehicles can be performed.

The external terminal 6 may acquire external terminal position information indicating the position of the external terminal 6, and the external terminal 6 may transmit the external terminal position information to the external terminal communication unit 12. The external terminal communication unit 12 outputs the received external terminal position information to the communication area determination unit 13. When the position indicated by the external terminal position information is at the own house 30, or the position indicated by the external terminal position information is inside an own house peripheral area being an area including the own house 30, the communication area determination unit 13 may determine theft of the registration vehicle, on the basis of at least one of the vehicle information and the vehicle position information acquired from the registration vehicle. For example, when the position indicated by the external terminal position information is inside the own house peripheral area and it has been determined that the registration vehicle has been thieved, on the basis of information such as the engine operation state, the vehicle orientation angle, or decreased radio wave reception intensity in vehicle-to-vehicle communication, which are obtained from the vehicle information, the communication area determination unit 13 may output a registration vehicle theft signal to the external terminal 6 via the external terminal communication unit 12. The external terminal 6 displays the received registration vehicle theft signal on the display unit. Accordingly, the user can know there is a possibility that the registration vehicle has been thieved. Further, when the position indicated by the external terminal position information is inside the own house peripheral area and it has been determined that the registration vehicle has been thieved, on the basis of at least one of the vehicle information and the vehicle position information, the communication area determination unit 13 may output a theft-time device control signal to the device 5a and the device 5b via the device communication unit 16. The device 5a and the device 5b having received the theft-time device control signal each execute a control instructed by the theft-time device control signal. For example, when the device 5a is a lighting device, the theft-time device control signal for the device 5a is a control signal for blinking the lighting device. Through blinking of the device 5a having received the theft-time device control signal, it is possible to notify the user that there is a possibility that the registration vehicle has been thieved. For example, when the distance between the position indicated by the external terminal position information and the position indicated by the vehicle position information of the registration vehicle is greater than a predetermined distance threshold, the engine rotation speed obtained from the vehicle information of the registration vehicle is greater than a predetermined speed threshold, and the vehicle speed obtained from the vehicle information of the registration vehicle is greater than a predetermined vehicle speed threshold, the communication area determination unit 13 may determine that the registration vehicle has been thieved. The theft determination regarding the registration vehicle may be executed a plurality of times every predetermined time period, and when determination that the registration vehicle has been thieved has been consecutively made a predetermined number of times, it may be eventually determined that the registration vehicle has been thieved. Further, the vehicle information may include a radio wave intensity of vehicle-to-vehicle communication, and whether or not the radio wave intensity of vehicle-to-vehicle communication has become smaller than a predetermined radio wave intensity threshold may be added to a condition for theft determination performed by the communication area determination unit 13. Then, the communication area determination unit 13 may determine that the registration vehicle has been thieved when the radio wave intensity of the vehicle-to-vehicle communication is smaller than the radio wave intensity threshold.

As described above, the control system 50 according to the first embodiment includes: the control server 1; the on-vehicle device 2a, 2b mounted to the vehicle 7a, 7b; the device 5a, 5b to be controlled by a device control signal; and the external terminal 6 for transmitting a registration vehicle ID, device setting information, and information of the vehicle-to-vehicle communication area 31 and the device control area 32 to the control server 1. The on-vehicle device 2a includes: the vehicle information acquisition unit 20a for acquiring vehicle information including a vehicle ID unique to the vehicle 7a, and vehicle position information of the vehicle 7a; the server communication unit 21a for transmitting the vehicle information and the vehicle position information to the control server 1 and for receiving information from the control server 1; and the vehicle-to-vehicle communication unit 22a for performing vehicle-to-vehicle communication. The control server 1 includes: the external terminal communication unit 12 for performing communication with the external terminal 6; the device setting information storage unit 15 for storing the device setting information acquired from the external terminal communication unit 12; the area setting information storage unit 11 for storing information of the vehicle-to-vehicle communication area 31 and the device control area 32 acquired from the external terminal communication unit 12; the map information acquisition unit 10 for acquiring map information; the on-vehicle device communication unit 14 for performing communication with the on-vehicle device 2a, 2b; the device communication unit 16 for performing communication with the device 5a, 5b; and the communication area determination unit 13. The communication area determination unit 13: determines the vehicle for which the vehicle ID included in the vehicle information matches the registration vehicle ID, to be a registration vehicle; sets the on-vehicle device of the vehicle for which the vehicle ID included in the vehicle information matches the registration vehicle ID, as a registration on-vehicle device; outputs, when the registration vehicle is inside the vehicle-to-vehicle communication area 31, a vehicle-to-vehicle communication permission signal to the registration on-vehicle device via the on-vehicle device communication unit 14; generates the device control signal on the basis of the device setting information and a device control area determination result being a result of determination as to whether or not the registration vehicle is inside the device control area 32, and outputs the device control signal to the device 5a, 5b via the device communication unit 16; and outputs the vehicle information and the device control signal to the external terminal 6 via the external terminal communication unit 12. In the on-vehicle device 2a, when the server communication unit 21a has received the vehicle-to-vehicle communication permission signal, the vehicle-to-vehicle communication unit 22a performs vehicle-to-vehicle communication. Therefore, there is no need for the user to vocalize, and the device can be controlled by merely moving the vehicle 7a to a specific area.

Figure 6:
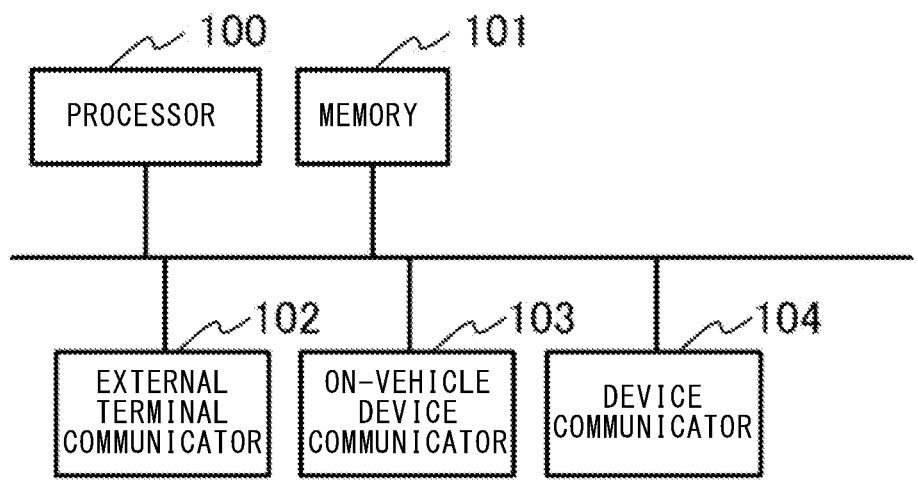
FIG. 6 is a schematic diagram showing an example of hardware configuration of the control server in the first embodiment.

FIG. 6 is a schematic diagram showing an example of a hardware configuration of the control server 1 according to the first embodiment. The map information acquisition unit and the communication area determination unit 13 are realized by a processor 100 such as a central processing unit (CPU) which executes a program stored in a memory 101. The memory 101 is also used as a transitory storage device in each process executed by the processor 100. A plurality of processing circuits may cooperatively execute the above function. Further, the above function may be realized by processing circuitry. When the processing circuitry is realized by dedicated hardware, the dedicated hardware is, for example, a single circuit, a complex circuit, a programed processor, an ASIC, an FPGA, or a combination of these. The above function may be realized by a combination of dedicated hardware and software, or a combination of dedicated hardware and firmware. The memory 101 is, for example, a nonvolatile or volatile semiconductor memory such as RAM, ROM, flash memory, or EPROM, a magnetic disc, an optical disc, or a combination of these. The area setting information storage unit 11 and the device setting information storage unit 15 are realized by the memory 101. The external terminal communication unit 12 is an external terminal communicator 102, the on-vehicle device communication unit 14 is an on-vehicle device communicator 103, and the device communication unit 16 is a device communicator 104. The processor 100, the memory 101, the external terminal communicator 102, the on-vehicle device communicator 103, and the device communicator 104 are connected to each other via a bus.

Figure 7:
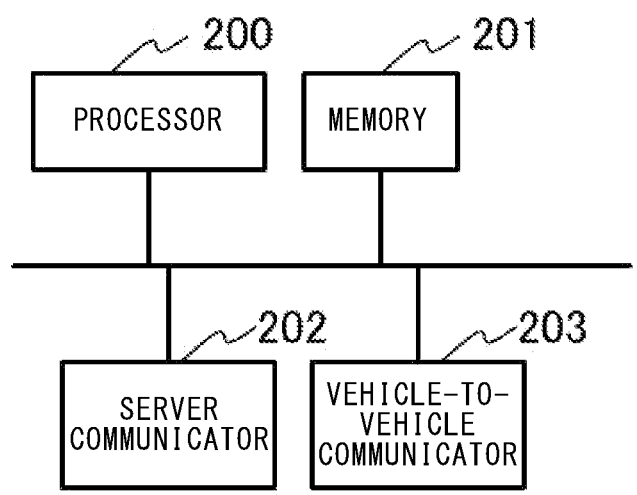
FIG. 7 is a schematic diagram showing an example of hardware configuration of the on-vehicle device in the first embodiment.

FIG. 7 is a schematic diagram showing an example of a hardware configuration of the on-vehicle device 2a according to the first embodiment. The vehicle information acquisition unit 20a is realized by a processor 200 such as a central processing unit (CPU) which executes a program stored in a memory 201. The memory 201 is also used as a transitory storage device in each process executed by the processor 200. A plurality of processing circuits may cooperatively execute the above function. Further, the above function may be realized by dedicated hardware. When the above function is realized by dedicated hardware, the dedicated hardware is, for example, a single circuit, a complex circuit, a programed processor, an ASIC, an FPGA, or a combination of these. The above function may be realized by a combination of dedicated hardware and software, or a combination of dedicated hardware and firmware. The memory 201 is, for example, a nonvolatile or volatile semiconductor memory such as RAM, ROM, flash memory, or EPROM, a magnetic disc, an optical disc, or a combination of these. The server communication unit 21a is a server communicator 202, and the vehicle-to-vehicle communication unit 22a is a vehicle-to-vehicle communicator 203. The processor 200, the memory 201, the server communicator 202, and the vehicle-to-vehicle communicator 203 are connected to each other via a bus.

Although the present disclosure is described above in terms of an exemplary embodiment, it should be understood that the various features, aspects, and functionality described in the embodiment are not limited in their applicability to the particular embodiment with which they are described, but instead can be applied alone or in various combinations to the embodiment of the disclosure.

It is therefore understood that numerous modifications which have not been exemplified can be devised without departing from the scope of the present disclosure. For example, at least one of the constituent components may be modified, added, or eliminated.

DESCRIPTION OF THE REFERENCE CHARACTERS

1 control server
2a, 2b on-vehicle device
3a, 3b ECU
4a, 4b GPS receiver
5a, 5b device
6 external terminal
7a, 7b vehicle
10 map information acquisition unit
11 area setting information storage unit
12 external terminal communication unit
13 communication area determination unit
14 on-vehicle device communication unit
15 device setting information storage unit
16 device communication unit
20a vehicle information acquisition unit
21a server communication unit
22a vehicle-to-vehicle communication unit
30 own house
31 vehicle-to-vehicle communication area
32 device control area
50 control system
100 processor
101 memory
102 external terminal communicator 103 on-vehicle device communicator
104 device communicator
200 processor
201 memory
202 server communicator
203 vehicle-to-vehicle communicator

What is claimed is:

1. A control system comprising:

a control server;

an on-vehicle device mounted to a vehicle;

a device to be controlled by a device control signal; and an external terminal for transmitting a registration vehicle ID, device setting information, and information of a vehicle-to-vehicle communication area and a device control area to the control server, wherein the on-vehicle device includes a vehicle information acquisition circuitry to acquire vehicle information including a vehicle ID unique to the vehicle, and vehicle position information of the vehicle, a server communicator to transmit the vehicle information and the vehicle position information to the control server and for receiving information from the control server, and a vehicle-to-vehicle communicator to perform vehicle-to-vehicle communication, the control server includes an external terminal communicator to perform communication with the external terminal, a device setting information storage memory to store the device setting information acquired from the external terminal communicator, an area setting information storage memory to store information of the vehicle-to-vehicle communication area and the device control area acquired from the external terminal communicator, a map information acquisition circuitry to acquire map information, an on-vehicle device communicator to perform communication with the on-vehicle device, a device communicator to perform communication with the device, and a communication area determination circuitry, the communication area determination circuitry determines the vehicle for which the vehicle ID included in the vehicle information matches the registration vehicle ID, to be a registration vehicle, sets the on-vehicle device of the vehicle for which the vehicle ID included in the vehicle information matches the registration vehicle ID, as a registration on-vehicle device, outputs, when the registration vehicle is inside the vehicle-to-vehicle communication area, a vehicle-to-vehicle communication permission signal to the registration on-vehicle device via the on-vehicle device communicator, generates the device control signal on the basis of the device setting information and a device control area determination result being a result of determination as to whether or not the registration vehicle is inside the device control area, and outputs the device control signal to the device via the device communicator, and outputs the vehicle information and the device control signal to the external terminal via the external terminal communicator, and in the on-vehicle device, when the server communicator has received the vehicle-to-vehicle communication permission signal, the vehicle-to-vehicle communicator performs vehicle-to-vehicle communication.

2. The control system according to claim 1, wherein the vehicle-to-vehicle communication area and the device control area are each set by designating a coordinate on a map in the external terminal.

3. The control system according to claim 1, wherein the device setting information includes an intra-area control signal being the device control signal at a time when the registration vehicle is inside the device control area, and an extra-area control signal being the device control signal at a time when the registration vehicle is outside the device control area.

4. The control system according to claim 3, wherein the device transmits the device setting information to the control server, and the device setting information storage memory stores the device setting information acquired from the device.

5. The control system according to claim 3, wherein the communication area determination circuitry outputs the intra-area control signal to the device via the device communicator when the registration vehicle is inside the device control area, and outputs the extra-area control signal to the device via the device communicator when the registration vehicle is outside the device control area.

6. The control system according to claim 4, wherein the communication area determination circuitry outputs the intra-area control signal to the device via the device communicator when the registration vehicle is inside the device control area, and outputs the extra-area control signal to the device via the device communicator when the registration vehicle is outside the device control area.

7. The control system according to claim 5, wherein the device executes a control instructed by the intra-area control signal when the device has received the intra-area control signal, and executes a control instructed by the extra-area control signal when the device has received the extra-area control signal.

8. The control system according to claim 6, wherein the device executes a control instructed by the intra-area control signal when the device has received the intra-area control signal, and executes a control instructed by the extra-area control signal when the device has received the extra-area control signal.

9. The control system according to claim 1, wherein when the device has received a device state confirmation signal from the device communicator of the control server, the device transmits device state information to the device communicator.

10. The control system according to claim 9, wherein the communication area determination circuitry outputs the device state information acquired from the device communicator, to the external terminal via the external terminal communicator.

11. The control system according to claim 1, wherein the device setting information includes a device control vehicle ID and vehicle-limited device setting information corresponding to the device control vehicle ID, and the communication area determination circuitry
  determines the vehicle for which the vehicle ID included in the vehicle information matches the device control vehicle ID, to be a device control vehicle, and
  generates the device control signal on the basis of the vehicle-limited device setting information and a device control vehicle area determination result being a result of determination as to whether or not the device control vehicle is inside the device control area.

12. The control system according to claim 1, wherein
in the on-vehicle device,
when the server communicator has received a vehicle state confirmation signal from the control server, the vehicle information acquisition circuitry acquires the vehicle information and the vehicle position information, and the server communicator transmits the vehicle information and the vehicle position information to the control server.

13. The control system according to claim 1, wherein
when vehicle-to-vehicle communication has been interrupted during the vehicle-to-vehicle communication, the on-vehicle device transmits a vehicle-to-vehicle communication interruption signal indicating that the vehicle-to-vehicle communication has been interrupted, to the control server.

* * * * *